(12) United States Patent
Fraberger

(10) Patent No.: US 6,550,658 B2
(45) Date of Patent: Apr. 22, 2003

(54) RECORDING AND/OR REPRODUCING APPARATUS INCLUDING AT LEAST ONE GUIDE ARRANGEMENT HAVING AT LEAST ONE DAMPING PROJECTION

(75) Inventor: Ewald Fraberger, Bad Vöslau (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/784,431

(22) Filed: Feb. 15, 2001

(65) Prior Publication Data
US 2001/0023885 A1 Sep. 27, 2001

(30) Foreign Application Priority Data
Feb. 18, 2000 (EP) .............................. 00890048

(51) Int. Cl.⁷ .......................... B65H 20/00; B65H 23/04
(52) U.S. Cl. ................ 226/193; 242/615.2; 242/615.3; 242/615.4
(58) Field of Search ............................... 226/189, 193; 242/346.2, 615.2, 615.3, 615.4

(56) References Cited
U.S. PATENT DOCUMENTS

| | | | | |
|---|---|---|---|---|
| 3,240,442 A | * | 3/1966 | Kilmartin | 226/193 |
| 3,800,993 A | * | 4/1974 | Stephens | 226/193 |
| 4,199,794 A | | 4/1980 | Pfost et al. | |
| 4,310,863 A | * | 1/1982 | Lelandais | 242/615.4 |
| 4,389,010 A | * | 6/1983 | Oishi et al. | 242/346.2 |
| 4,456,160 A | * | 6/1984 | Schoettle et al. | 242/615.2 |
| 4,491,891 A | * | 1/1985 | Shiba | 242/346.2 |
| 5,152,474 A | * | 10/1992 | Hicks | 226/189 |
| 5,447,278 A | * | 9/1995 | Lalouette et al. | 242/615.4 |
| 5,516,055 A | * | 5/1996 | Gerfast et al. | 242/340 |
| 5,854,330 A | * | 12/1998 | Schoeppel et al. | 254/266 |
| 5,957,361 A | * | 9/1999 | Kobayashi et al. | 226/189 |
| 6,027,778 A | * | 2/2000 | Alahapperuma et al. | 242/346.2 |

FOREIGN PATENT DOCUMENTS

WO    9844499    10/1998

* cited by examiner

Primary Examiner—Michael R. Mansen

(57) ABSTRACT

A recording and/or reproducing apparatus having at least one guide arrangement that facilitates recording and reproduction even when a tape edge comes into contact with an end flange of the guide arrangement. The guide arrangement structure preferable is in the form of a tape guide roller, for guiding a record carrier in the guide arrangement. There is at least one damping projection in the area of the guide surface. The damping projection extends in tangential directions of the guide surface and is adapted to damp axial relative movements of the record carrier with respect to the guide arrangement.

14 Claims, 2 Drawing Sheets

RECORDING AND/OR REPRODUCING APPARATUS INCLUDING AT LEAST ONE GUIDE ARRANGEMENT HAVING AT LEAST ONE DAMPING PROJECTION

BACKGROUND OF THE INVENTION

1. Field of the Invention

The invention relates to a recording and/or reproducing apparatus, and particularly relates to a guide arrangement.

2. Description of the Related Art

Such a recording and/or reproducing apparatus (hereinafter briefly referred to as the apparatus) and such a guide arrangement are known, for example from the patent document WO 98/44499 A1. The known apparatus is a so-called data streamer intended and constructed for the storage of large amounts of data on a magnetic tape. For this purpose, the known apparatus has drive means with the aid of which a magnetic tape is driven with a comparatively high transport speed, as a result of which a more or less satisfactory air film is formed between the magnetic tape and the guide surfaces of two guide arrangements, i.e. two tape guide rollers. Said apparatus further has a multi-track magnetic head whose relative position, i.e. its height position, with respect to a magnetic tape is controllable with the aid of an actuator device, so as to enable a plurality of pre-defined mutually parallel tracks on the magnetic tape to be followed as exactly as possible and thus always enable a correct recording and reproduction to be achieved. In the known apparatus external influences on the magnetic tape, but also internal conditions in the magnetic tape, may result in the magnetic tape being subjected to forces which cause the magnetic tape to be deflected transversely to the transport direction of the magnetic tape, as a result of which at least one tape edge of the magnetic tape comes into contact with an end flange of at least one of the two tape guide rollers. This contact of a tape edge of the magnetic tape with an end flange, in its turn, leads to variations of comparatively high frequency in the height position of the magnetic tape, which height variations lie in a frequency range of approximately 500 Hz and even higher. However, these high frequency variations in the height position of the magnetic tape occur not only in the area of the tape guide rollers but also in the area of the multi-track magnetic head, which as already stated is movable in height with the aid of the actuator device in order to always guarantee a correct tracking. However, with the aid of the actuator device in the known apparatus the multi-track magnetic head is only capable of following those variations in the height position of the magnetic tape whose frequency is lower than the frequency of the variations in the height position of the magnetic tape which are caused by the magnetic tape coming into contact with an end flange. With the aid of the actuator device the magnetic head can follow only variations in the height position of the magnetic head which have a frequency of approximately 200 Hz but not the aforementioned variations having a frequency of at least 500 Hz. However, this means that as a result of an undesired but frequently inevitable contact of at least one of the tape edges of the magnetic tape with an end flange a correct tracking is no longer guaranteed and, consequently, a correct recording and reproduction is no longer guaranteed.

SUMMARY OF THE INVENTION

It is an object of the invention to preclude the aforementioned problems and to provide an improved recording and/or reproducing apparatus and an improved guide arrangement, which improved embodiments always ensure a correct recording and/or reproduction even when a tape edge of a magnetic tape comes into contact with an end flange of a guide arrangement.

To achieve this object, according to the invention, the characteristics features are provided in a recording and/or reproducing apparatus.

To achieve the object, according to the invention, the characteristics features are provided in a guide arrangement.

Owing to the provision of the characteristic features in accordance with the invention it is achieved by simple means that there is a direct mechanical contact between the at least one damping projection of the at least one guide arrangement and the record carrier tape guided by means of this guide arrangement, i.e. no air film is formed between the guide surface of the guide arrangement and the record carrier tape at this location, as a result of which in the area of the damping projection a friction effect is produced between the record carrier tape and the damping projection, by means of which a damping of axial relative movements of the record carrier tape with respect to the guide arrangement is achieved. This guarantees that excursions of the driven record carrier tape in an axial direction of a guide arrangement, which excursions are caused by external influences on the magnetic tape as well as by internal conditions in the magnetic tape, are damped to such an extent by the at least one damping projection of the guide arrangement that at least one tape edge of the record carrier tape does not or only to a greatly weakened extent come into contact with an end flange of the guide arrangement, as a result of which no or hardly any high frequency variations in the height position of the record carrier tape occur and, as a consequence, such high frequency variations occur neither at the location of the magnetic head and therefore always a correct recording and/or reproduction by means of the magnetic head is guaranteed.

In a recording and/or reproducing apparatus in accordance with the invention and in a guide arrangement in accordance with the invention the use of one damping projection is adequate. However, in practice it has been advantageous to provide two damping projections that are axially spaced apart a distance from one another. It is to be noted that an embodiment of the invention may alternatively have more than two damping projections, for example, three, four, or five of such damping projections according to need. The number of damping projections also depends on the axial dimension of a guide arrangement.

In a recording and/or reproducing apparatus in accordance with the invention the at least one damping projection may extend parallel to a plane which is inclined with respect to the guide axis of the guide arrangement. The at least one damping projection may then in itself by slightly undulate. However, in practice it is has been advantageous when a recording and/or reproducing apparatus in accordance with the invention and a guide arrangement in accordance with the invention utilizes a damping projection extending parallel to a plane that extends perpendicularly to the guide shaft of the guide arrangement. This arrangement has proved to be advantageous in view of a construction which is as simple as possible and in view of a production which is as simple as possible.

In a recording and/or reproducing apparatus in accordance with the invention and in a guide arrangement in accordance with the invention, the at least one damping projection may be rectangular or trapezoidal or substantially triangular with one rounded free corner in a radial cross-sectional view. However, it has been particularly advantageous when a recording and/or reproducing apparatus in accordance with the invention and a guide arrangement in accordance with the invention has a dome-shaped damping projection when view in a radial cross section. Such an embodiment has proved to be advantageous in view of a simple production but primarily in view of cooperation as gentle as possible with a record carrier tape.

In a recording and/or reproducing apparatus in accordance with the invention and in a guide arrangement in accordance with the invention it has been proved to be very advantageous when the height of the damping projection is based on the speed of the transport of record carrier and the curvature of the guide surface of the guide arrangement. These embodiments have proved to be advantageous in tests carried out during the development of a recording and/or reproducing apparatus in accordance with the invention and a guide arrangement in accordance with the invention.

In a recording and/or reproducing apparatus in accordance with the invention and a guide arrangement in accordance with the invention it has proved to be particularly advantageous when, in addition, the characteristic features are provided. Such an embodiment has the advantage that the tape guide roller provided as guide arrangement is moved along by a record carrier tape when this record carrier is driven, as a result of which hardly any relative movement in a circumferential direction occurs between the record carrier tape and the at least one damping projection of the tape guide roller, which provides a particularly high damping effect of the at least one damping projection on axial excursions of the record carrier tape.

However, it is emphasized that a guide arrangement in accordance with the invention may alternatively have a curved and, preferably, cylindrical guide surface, which may be supported so as to be stationary or rotatable with respect to its guide axis, which guide surface may have an end flange in the area of each of its two axial ends, which flange does not have a direct mechanical connection with the guide surface. This makes it possible, for example, to combine a rotatably supported cylindrical guide surface of a guide arrangement with stationary end flanges of this guide arrangement.

The above-mentioned as well as further aspects of the invention will become apparent from the embodiments described hereinafter by way of example and will be elucidated with reference to these examples.

BRIEF DESCRIPTION OF THE DRAWINGS

The invention will now be described in more detail with reference to the drawings, which shows some embodiments given by way of example but to which the invention is not limited.

DETAILED DESCRIPTION OF THE EMBODIMENTS

Figure 1:
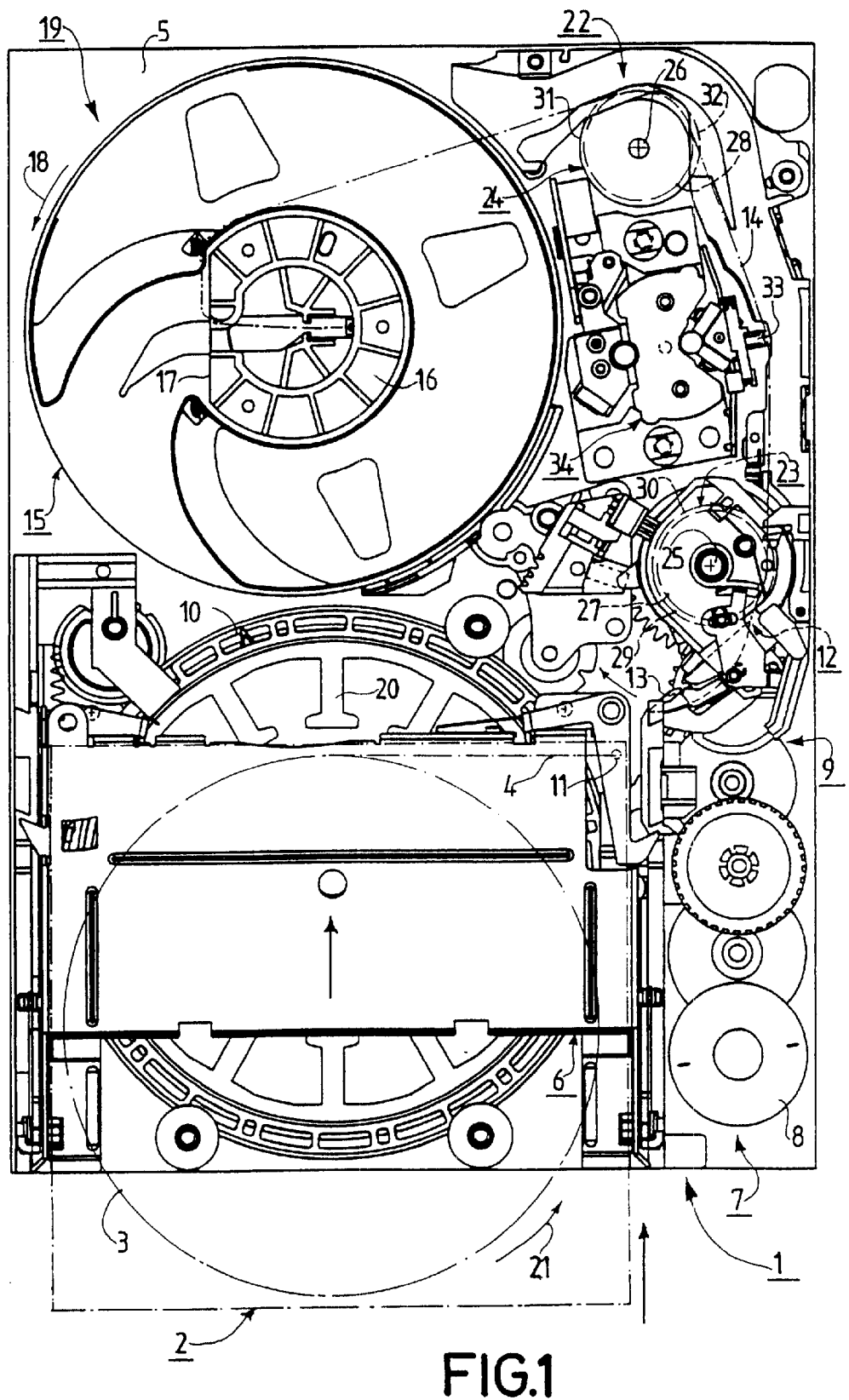
FIG. 1 is a plan view which shows a recording and reproducing apparatus in accordance with an embodiment of the invention, which apparatus includes two guide arrangements which serve for guiding a magnetic tape and which are each formed by a tape guide roller.

FIG. 1 shows a recording and reproducing apparatus 1 which serves and is configured for the recording and reproduction of digital data and by means of which a large amount of data can be stored. The recording and reproducing apparatus 1 is briefly referred to hereinafter as the storage apparatus 1.

The storage apparatus 1 is a development of a recording and reproducing apparatus which includes features forming the subject matter of nine patent applications in total, namely the European priority patent applications bearing the application numbers 98 890 332.4, 98 890 333.2, 98 890 334.0, 98 890 335.7, 98 890 336.5, 98 890 337.3, 98 890 338.1, 98 890 339.9 and 98 890 340.7 filed on Nov. 12, 1998. Said recording and reproducing apparatus was already shown at the Comdex fair of Las Vegas in the USA from Nov. 15, 1998 and is consequently known. The disclosure represented by the exhibited recording and reproducing apparatus and for a substantial part contained in the nine aforementioned European priority patent applications is incorporated herein by reference. For this reason, the remainder of the description of the storage apparatus shown in FIG. 1 is limited to only those areas and parts which are relevant in the present context. Furthermore, in the present context reference is also made to the two European priority patent applications bearing the application numbers 99 890 360.3 and 99 890 361.1, both filed on Nov. 11, 1999.

A cassette 2, which is shown only in dash-dot lines in FIG. 1, can be loaded into the storage apparatus 1. The cassette 2 accommodates a supply reel 3, on which a magnetic tape 4 is wound, which tape as well as the supply reel 3 are shown merely as dash-dot lines in FIG. 2. The magnetic tape 4 can be scanned along a plurality of tracks which extend in the longitudinal direction of the magnetic tape 4, in order to record or reproduce digital data.

The storage apparatus 1 has a chassis 5 which carries the individual constructional units and parts of the storage apparatus 1. Hereinafter, only those of the constructional units and parts are mentioned which are relevant in the present context.

For holding a cassette 2 and moving it from a loading position into an operating position in the storage apparatus 1 the storage apparatus 1 has a movable cassette holder 6. The movable cassette holder 6 is movable along an L-shaped path of movement between a loading position, in which a cassette 2 can be inserted into the cassette holder 6, and an operating position, in which an inserted cassette 2 is in its operating position.

To move the cassette holder 6 and further movable apparatus parts of the storage apparatus 1 the storage apparatus 1 has drive means 7. The drive means 7 include a motor 8 and a gear mechanism 9, by means of which a ring-shaped drive gear wheel 10 is drivable. With the aid of the ring-shaped drive gear wheel 10 cam devices, by means of which the movable cassette holder 6 is movable, can be driven via gear racks.

When the cassette holder 6 is in its operating position a cassette 2 loaded into the cassette holder 6 is also in its operating position. As already stated, the cassette 2 accommodates a supply reel 3 on which the magnetic tape 4 is wound. At the free end of the magnetic tape 4 the magnetic tape 4 is connected to a coupling pin 11. In the operating position of the cassette 2 pull-out means 12 can be coupled to the coupling pin 11, which means include a pull-out element 13 and a pull-out tape 14. For the clarity of the drawing the pull-out tape 14 is shown as a dash-dot line in FIG. 1. The pull-out tape 14 is passed from pull-out element 13 to a take-up reel 15 and is fixedly connected to a hub portion 16 of the take-up reel 15. The hub portion 16 has a recess 17 which is adapted to receive the pull-out element 13. By means of a first motor, not shown, of the storage apparatus 1 the take-up reel 15 is rotationally drivable in a direction indicated by an arrow 18. The rotational drive of the take-up reel 15 enables the pull-out tape 14 and, consequently, the pull-out element 13 to be driven, as a result of which, after coupling of the pull-out element 13 to the coupling pin 11, the magnetic tape 4 can be pulled out of the cassette 2 with the aid of the pull-out tape 14 and can be moved up to the take-up reel 15 and can be wound onto the take-up reel 15, upon which recording on or reproducing from the magnetic tape 4 is possible.

The storage apparatus 1 has drive means 19 for driving the magnetic tape 4. The drive means 19 include the first motor, not shown, which has been provided in the storage apparatus 1 in order to drive the take-up reel 15 and which drives the take-up reel 15 with the aid of a drive member, not shown, which also forms a part of the drive means 19. The drive means 19 further include a second motor, which is not shown completely. FIG. 1 only shows a stator section 20 of the second motor, which stator section carries excitation coils, not shown, by means of which a rotor, not shown, of this second motor can be driven. The second motor can drive crown-like gear teeth which mesh with crown-like mating gear teeth provided on the supply reel 3, the supply reel 3 thus being drivable in a direction indicated by an arrow 21 by means of the second motor to wind the magnetic tape 4 onto the supply reel 3.

The storage apparatus 1 further has guide means 22 for guiding the magnetic tape 3. In the present case the guide means 22 include two guide arrangements 23 and 24. Each of the two guide arrangements 23 and 24 has a guide shafts, 25 and 26 respectively. Each of the two guide arrangements 23 and 24 further has a guide surface, 27 and 28 respectively, which is curved with respect to the respective guide shaft 25 or 26. Finally, each of the two guide arrangements 23 and 24 has an end flange, 29, 30 and 31, 32 respectively, in the area of each of the two axial ends of the respective guide surfaces 27 and 28, which end flanges extend transversely to the respective guide shafts 25 and 26, as is illustrated for the guide arrangement 24 in FIG. 2. In the present case, the two guide arrangements (or two tape guide roller) 23 and 24, which are rotatable about the respective guide shafts 25 and 26. The guide shaft 25 or 26 is stationarily connected to the chassis 5.

The storage apparatus 1 further has a multi-track magnetic head 33 which serves for scanning the magnetic tape 4. The magnetic head 33 is mounted on an actuator device 34 by means of which the magnetic head 33 is movable in a direction perpendicular to the longitudinal direction of the magnetic tape 4 to keep the individual magnet systems of the multi-track magnetic head 33 constantly aligned with respect to the scanning tracks of the magnetic tape 4, so as to guarantee an exact tracking. The magnetic head 33 is arranged in the area between the two guide arrangements 23 and 24, i.e. between the two tape guide rollers 23 and 24. With the aid of the actuating device 34 the magnetic head 33 can follow variations in the height position of the magnetic tape 4, namely those variations in the height position whose frequency is of the order of magnitude of approximately 200 Hz.

Figure 2:
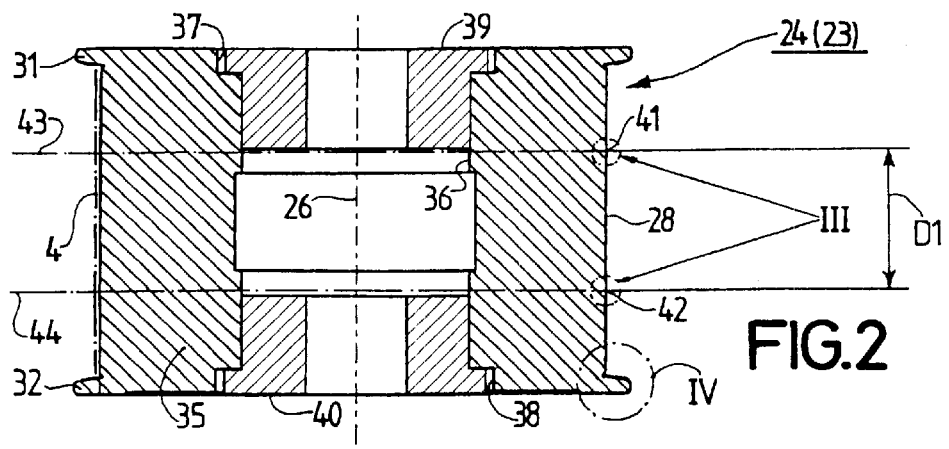
FIG. 2 is an axial cross-sectional view of a tape guide roller of the apparatus shown in FIG. 1.

As is apparent from FIG. 2, the guide arrangement 24, which is also referred to hereinafter as the tape guide roller, comprises an outer part 35 whose circumferential bounding surface forms the guide surface 28 and whose axial end portions form the end flanges 31 and 32. The outer part 35 has a central bore 36 having at each of its axial ends a respective bore portion 37 or 38 whose diameter is larger than that of the portion of the bore 36 situated between them. The bore 36 accommodates two ball-bearings, of which only the outer rings 39 and 40 are shown in FIG. 2. The parts of the two ball-bearings situated between the outer rings 39 and 40 in a radial direction are not shown. The ball-bearings support the guide arrangement 24 so as to be rotatable with respect to the guide shaft 26, which is not shown in FIG. 2 but which is only represented diagrammatically as a dash-dot line.

In the area of its guide surface 28 the guide arrangement 24 has two damping projections 41 and 42, which are spaced at a distance D1 from one another and which are adapted to damp axial relative movements of the magnetic tape 4 with respect to the guide arrangement 24. Owing to the small size of the damping projections 41 and 42 the two damping projections 41 and 42 are hardly visible in FIG. 2 and can only be seen in FIG. 3, which shows a part of the guide surface 28 of the guide arrangement 24, which part carries one of the two damping projections 41(42). The two damping projections 41 and 42 each extend parallel to a plane 43 or 44, which plane extends perpendicularly to the guide shaft 26 and is shown as a dash-dot line in FIGS. 2 and 3.

Figure 3:
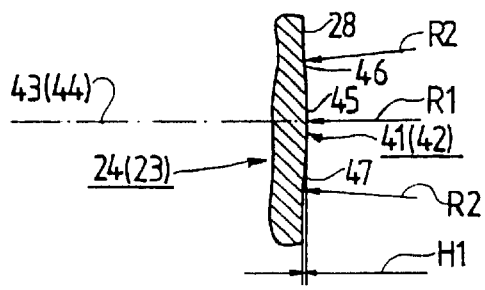
FIG. 3 shows a detail of the tape guide roller shown in FIG. 2, which detail is situated in an area marked by two circles III in FIG. 2.

As is apparent from FIG. 3, the two damping projections 41 and 42 are dome-shaped in a radial cross-section. This is achieved in that the two damping projections 41 and 42 have a central portion 45 having a radius R1 of, for example, 3±0.2 mm, which central portion 45 is bounded by two edge portions 46 and 47, each having a radius R2 of 1±0.2 mm. Each of the two damping projections 41 and 42 has a height H1 with respect to the remainder of the guide surface 28, which height has a value of approximately 0.02±0.005 mm and preferably a highly accurate value of 0.02 mm.

With respect to the value of the height H1 it is to be noted that the value of the height H1 of the two damping projections 41 and 42 is defined in dependence on the speed of transport of the magnetic tape 4 and the curvature of the guide surface 28 of the tape guide roller 42. In the case of the present storage apparatus 1, in which the speed of transport of the magnetic tape 4 is approximately 4.0 m/s and the curvature of the guide surface 28 is defined by the radius of curvature of the guide surface 28, i.e. by the diameter of the tape guide roller 24 in the area of its guide surface 28, which radius of curvature has a value of 10 mm, the advantageous value of the height H1 lies in the range of 0.02±0.005 mm.

Figure 4:
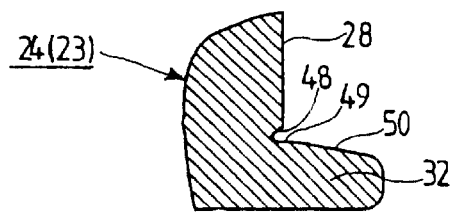
FIG. 4 shows a further detail of the tape guide roller shown in FIG. 2, which further detail is situated in an area marked by a circle IV in FIG. 2.

For the construction of the guide arrangement 24 in the area of the two end flanges 31 and 32 reference is also made to FIG. 4 which is a representation to a larger scale than in FIG. 2. As can be seen in FIG. 4, a receding portion 48 is provided in the area of the transition between the guide surface 28 and the end flange 32. Starting from the recessed portion 48 the bounding surface of the end flange 32 first has a bounding portion 49 adjoined by a bounding portion 50 which is inclined with respect to the guide shaft 26. A similar construction is also used in the area of the other end flange 31 of the guide arrangement 24.

The construction of the tape guide roller 24 described above is identical for the other tape guide roller 23.

Figure 5:
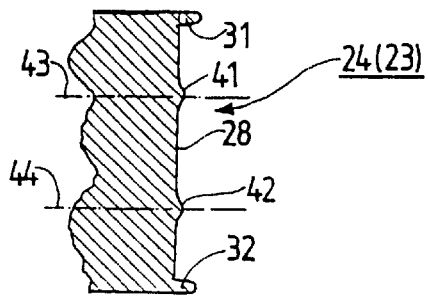
FIG. 5 diagrammatically illustrates the principle of the construction of the tape guide roller shown in FIG. 2.

FIG. 5 illustrates the principle of the construction of the guide arrangement 24.

Figure 6:
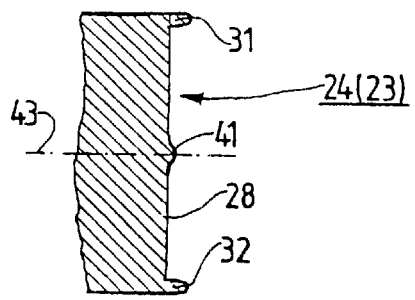
FIG. 6 illustrates, in a manner similar to FIG. 5, the principle of a further tape guide roller which can be used in an apparatus as shown in FIG. 1.

FIG. 6 illustrates the principle of a further tape guide roller 24. The tape guide roller 24 shown in FIG. 6 has only one damping projection 41.

It is to be noted that tape guide rollers as well as differently constructed guide arrangements may alternatively have more than one damping projection and more than two damping projections, for example three, four or five damping projections. The number of damping projections depends in particular on the axial dimension of the tape guide surface of a guide arrangement.

What is claimed is:

1. A recording and/or reproducing apparatus having drive means for driving record carrier in the form of a tape and having guide means for guiding the record carrier, which guide means include at least one guide arrangement having a guide shaft and having a guide surface which is curved with respect to the guide shaft, having an end flange in the area of each of the two axial ends of the guide surface, which flange extends transversely to the guide shaft, and having a receding portion in the area between the guide surface and the end flange, wherein the at least one guide arrangement has at least one damping projection in the area of its guide surface, which damping projection extends in tangential directions of the guide surface, and the at least one damping projection is adapted to damp axial relative movements of the record carrier with respect to the guide arrangement.

2. A recording and/or reproducing apparatus as claimed in claim 1, wherein the at least one guide arrangement has two damping projections which are axially spaced apart at a distance from one another.

3. A recording and/or reproducing apparatus as claimed in claim 1, wherein the at least one damping projection extends parallel to a plane which extends perpendicularly to the guide shaft of the guide arrangement.

4. A recording and/or reproducing apparatus as claimed in claim 1, wherein the at least one damping projection is dome-shaped in a radial cross-section.

5. A recording and/or reproducing apparatus as defined in claim 1, wherein the height of the at least one damping projection is based on the operational speed of the transport carrier and the curvature of the guide surface of the guide arrangement.

6. A recording and/or reproducing apparatus as claimed in claim 5, wherein the predetermined height of the at least one damping projection lies in the range of 0.02±0.005 mm in the case of an operational speed of the transport carrier being approximately 4.0 m/s and a radius of curvature of the guide surface is 10 mm.

7. A recording and/or reproducing apparatus as claimed in claim 1, wherein the at least one guide arrangement is formed by a tape guide roller which is rotatable about the guide shaft, and the at least one damping projection extends over the whole circumference of the guide surface of the tape guide roller.

8. A guide arrangement adapted to guide a record carrier in the form of a tape and having a guide surface which is curved with respect to a guide shaft, having an end flange in the area of each of the two axial ends of the guide surface, which flange extends transversely to the guide shaft, and having a receding portion in the area between the guide surface and the end flange, wherein the at least one guide arrangement has at least one damping projection in the area of its guide surface, which damping projection extends in tangential directions of the guide surface, and the at least one damping projection is adapted to damp axial relative movements of the record carrier with respect to the guide arrangement.

9. A guide arrangement as claimed in claim 8, wherein the at least one guide arrangement has two damping projections which are axially spaced apart at a distance from one another.

10. A guide arrangement as claimed in claim 8, wherein the at least one damping projection extends parallel to a plane which extends perpendicularly to the guide shaft of the guide arrangement.

11. A guide arrangement as claimed in claim 8, wherein the at least one damping projection is dome-shaped in a radial cross-section.

12. A guide arrangement as defined in claim 8, wherein the height of the at least one damping projection is a predetermined value based on the operational speed of transport of the record carrier and the curvature of the guide surface of the guide arrangement.

13. A guide arrangement as claimed in claim 12, wherein a predetermined height of the at least one damping projection lies in the range of 0.02±0.005 mm in the case of the operational speed of transport is approximately 4.0 m/s and a radius of curvature of the guide surface is 10 mm.

14. A guide arrangement as claimed in claim 8, wherein the at least one guide arrangement (23, 24) is formed by a tape guide roller which is rotatable about the guide shaft, and the at least one damping projection extends over the whole circumference of the guide surface of the tape guide roller.

* * * * *